(12) United States Patent
Woo

(10) Patent No.: US 10,187,398 B2
(45) Date of Patent: Jan. 22, 2019

(54) METHOD AND APPARATUS FOR VERIFYING VALIDITY OF BEACON SIGNAL

(71) Applicant: SK PLANET CO., LTD., Seongnam-si, Gyeonggi-do (KR)

(72) Inventor: Jongwon Woo, Incheon (KR)

(73) Assignee: SK PLANET CO., LTD., Seongnam-si (KR)

( * ) Notice: Subject to any disclaimer, the term of this patent is extended or adjusted under 35 U.S.C. 154(b) by 65 days.

(21) Appl. No.: 14/945,954

(22) Filed: Nov. 19, 2015

(65) Prior Publication Data

US 2016/0294844 A1    Oct. 6, 2016

(30) Foreign Application Priority Data

Mar. 30, 2015 (KR) .................. 10-2015-0044014

(51) Int. Cl.
| | |
|---|---|
| H04L 29/06 | (2006.01) |
| G01S 1/68 | (2006.01) |
| H04W 4/021 | (2018.01) |
| H04W 12/06 | (2009.01) |
| H04W 4/80 | (2018.01) |

(52) U.S. Cl.
CPC .............. H04L 63/12 (2013.01); G01S 1/68 (2013.01); H04W 4/021 (2013.01); H04W 12/06 (2013.01); *H04W 4/80* (2018.02)

(58) Field of Classification Search
CPC .................................................. H04W 4/023
USPC ............................................................ 726/3
See application file for complete search history.

(56) References Cited

U.S. PATENT DOCUMENTS

| | | | | |
|---|---|---|---|---|
| 9,424,417 | B2 * | 8/2016 | Brown | .................. G06F 21/44 |
| 2014/0136652 | A1 | 5/2014 | Narayanaswami et al. | |
| 2014/0287682 | A1 * | 9/2014 | Minemura | ............ H04W 4/008 455/41.1 |
| 2014/0370879 | A1 * | 12/2014 | Redding | ............... H04W 4/001 455/419 |
| 2015/0026796 | A1 * | 1/2015 | Alan | ....................... G06F 21/31 726/19 |
| 2016/0037287 | A1 * | 2/2016 | Kim | ...................... H04W 4/008 455/456.1 |
| 2016/0050219 | A1 * | 2/2016 | Niewczas | ............. H04W 12/06 726/5 |
| 2016/0050564 | A1 * | 2/2016 | Niewczas | ............. H04W 12/06 455/411 |

(Continued)

FOREIGN PATENT DOCUMENTS

EP    2442600 A1    4/2012

OTHER PUBLICATIONS

European Search Report dated Jun. 13, 2016 corresponding to European Patent Application No. 15197141.3.

*Primary Examiner* — Khalil Naghdali
(74) *Attorney, Agent, or Firm* — Brinks Gilson & Lione

(57) ABSTRACT

Provided are a method, system, and apparatus for verifying the validity of a beacon signal. More particularly, the user terminal determines whether authentication information received from a beacon service server and authentication information received from a verification beacon server are the same to allow the received beacon signal to provide only user-desired information to a user, thus allowing the user to focus on purchasing activity in a member shop to increase shopping time and efficiency and promote consumption.

14 Claims, 13 Drawing Sheets

(56) References Cited

U.S. PATENT DOCUMENTS

2016/0066123 A1\* 3/2016 Ko ........................ H04W 4/005
　　　　　　　　　　　　　　　　　　　　　455/41.1

\* cited by examiner

METHOD AND APPARATUS FOR VERIFYING VALIDITY OF BEACON SIGNAL

CROSS-REFERENCE TO RELATED APPLICATION

This application claims priority to and the benefit of Korean Patent Application No. 10-2015-0044014 filed in the Korean Intellectual Property Office on Mar. 30, 2015, the entire contents of which are incorporated herein by reference.

TECHNICAL FIELD

The present invention relates to a method and apparatus for verifying the validity of a beacon signal, and more particularly, to a beacon signal validity verification method and apparatus in which a verification beacon device is provided in a shop and it is verified whether a beacon signal received by a user terminal is valid by determining whether authentication information received from a beacon service server is the same as authentication information received from the verification beacon device.

BACKGROUND

This section is intended to merely provide background for embodiments of the present invention and is not considered prior art in the claims.

With the development of mobile communication networks and the advance in terminal specifications, mobile communication terminals have become the necessity for modern people and have evolved into total entertainment equipment beyond typical simple communication devices or information providing devices.

Such mobile communication terminals have a function for performing short-range wireless communication, such as near field communication (NFC) or Bluetooth, in addition to a communication function through mobile communication networks.

NFC has a short communication distance and requires a separate wireless communication chip. However, Bluetooth has a relatively long communication distance and most terminals have a Bluetooth communication function equipped therein. Thus, various communication services are being developed using Bluetooth.

Further, service solutions for providing a variety of information to mobile communication terminals possessed by users are being developed using a beacon that utilizes Bluetooth communication.

As an example, a beacon-based content providing service is being used in which a beacon device installed in a member shop may transmit a periodic signal using electromagnetic or sound waves to drive a certain application of a nearby mobile communication terminal and provide desired content.

In this case, services provided by service providers may include services in various fields such as promotion, finance, payment, games, or the like, which are currently provided on the wired/wireless Internet, for example, a comparative simple promotion page service, a service for downloading a low-priced discount coupon, a service for paying for a product purchased in a store, and a service for downloading applications such as a game to users.

However, since anyone can transmit a Bluetooth beacon signal using a mobile device equipped with a Bluetooth communication function, a malicious user may provide false information to other users of mobile communication terminals. In addition, when communication ranges of beacon devices installed in a plurality of member shops that are located adjacent to one another overlap one another, a user may receive beacon information from an adjacent member shop, instead of receiving beacon information from a member shop in which the user is located, thus there is a problem in which the beacon information of the adjacent member shop is received.

PRIOR ART DOCUMENT

Patent Document

Korean Patent Application Publication No. 10-2014-0072771A published on Jun. 13, 2013, entitled "Method for Providing Information and Mobile Terminal"

SUMMARY

The present invention is intended to solve a problem in which, when a conventional mobile communication terminal receives a beacon signal, the terminal provides information linked with the beacon signal to a user without determining whether the beacon signal is needed and valid, thus allowing the user to be exposed to undesired information.

In particular, the present invention is directed to providing a method and apparatus for verifying a beacon signal by assigning authentication information to information received from a content beacon device, receiving the authentication information through a verification beacon device, verifying the validity of the beacon signal by determining whether information received from the beacon service server and the information received from the verification beacon device are the same, and determining whether the information is needed by the user.

One aspect of the present invention provides a beacon service server including a communication module configured to communicate with a user terminal and a beacon management server that manages beacon devices installed in member shops and including a verification beacon device, a control module configured to, when a validity verification request for a certain content beacon device is received from the user terminal, transmit authentication information for the validity verification to the user terminal and simultaneously perform control such that the authentication information is transmitted to the user terminal through a verification beacon device installed in a member shop corresponding to the content beacon device; and a storage module configured to store mapping information between the content beacon device and the member shop and the authentication information.

When a validity verification request for a plurality of content beacon devices is received from the user terminal, the control module may select one content beacon device based on distances between the user terminal and the content beacon devices to perform validity verification.

Another aspect of the present invention provides a method of verifying validity of a beacon signal by a beacon service server, the method including receiving a validity verification request for a certain content beacon device from a user terminal, transmitting authentication information for the validity authentication to the user terminal, and transmitting the authentication information to the user terminal through a verification beacon device installed in a member shop corresponding to the content beacon device.

The method may further include checking whether there is the member shop corresponding to the content beacon device, in which the authentication information is transmitted when there is the member shop and the authentication information is not transmitted when there is not the member shop.

When the verification beacon device transmits the authentication information to the verification beacon device, the verification beacon device may also transmit, to the user terminal, user information matched to the user terminal.

The method may further include generating the authentication information for the validity verification, and the generated authentication information may be one-time authentication information.

Still another aspect of the present invention provides a method of verifying validity of a beacon signal by a user terminal, the method including receiving a beacon signal from a content beacon device, requesting a beacon service server to verify validity of the received beacon signal, receiving authentication information from the beacon service server and authentication information from a nearby verification beacon device in response to the request; and comparing the authentication information received from the beacon service server with the authentication information received from the verification beacon device to determine the validity of the beacon signal according to whether the authentication information from the beacon service server and the authentication information from the verification beacon device are the same.

When user information received from the verification beacon device and the prestored user information are the same, the comparing of the authentication information received from the beacon service server and the authentication information received from the verification beacon device to determine the validity of the beacon signal is performed.

According to an embodiment of the present invention, in a beacon service provided on the basis of regions that are set inside or outside a member shop, it is possible to verify the validity of a beacon signal generated by a beacon device that is registered in a corresponding region among a plurality of beacon signals received by a user terminal, thus preventing a malicious beacon signal generated by an unregistered beacon device or a beacon signal generated by a beacon device installed in another adjacent member shop from being provided to the user terminal.

According to an embodiment of the present invention, it is also possible to verify the validity of a beacon signal generated by a registered beacon device in a member shop, thus providing only a beacon signal containing information about the member shop to a user who is visiting the member shop and providing support in order not to miss an opportunity to sell products to the user.

Furthermore, according to an embodiment of the present invention, it is possible to verify the validity of a beacon signal in each member shop, thus enabling the user to access information about only the member shop where the user is visiting. As a result, the user can focus on product purchasing activity in the member shop to reduce a product purchase time and increase shopping efficiency, and thus promote consumption.

DETAILED DESCRIPTION

Figure 1:
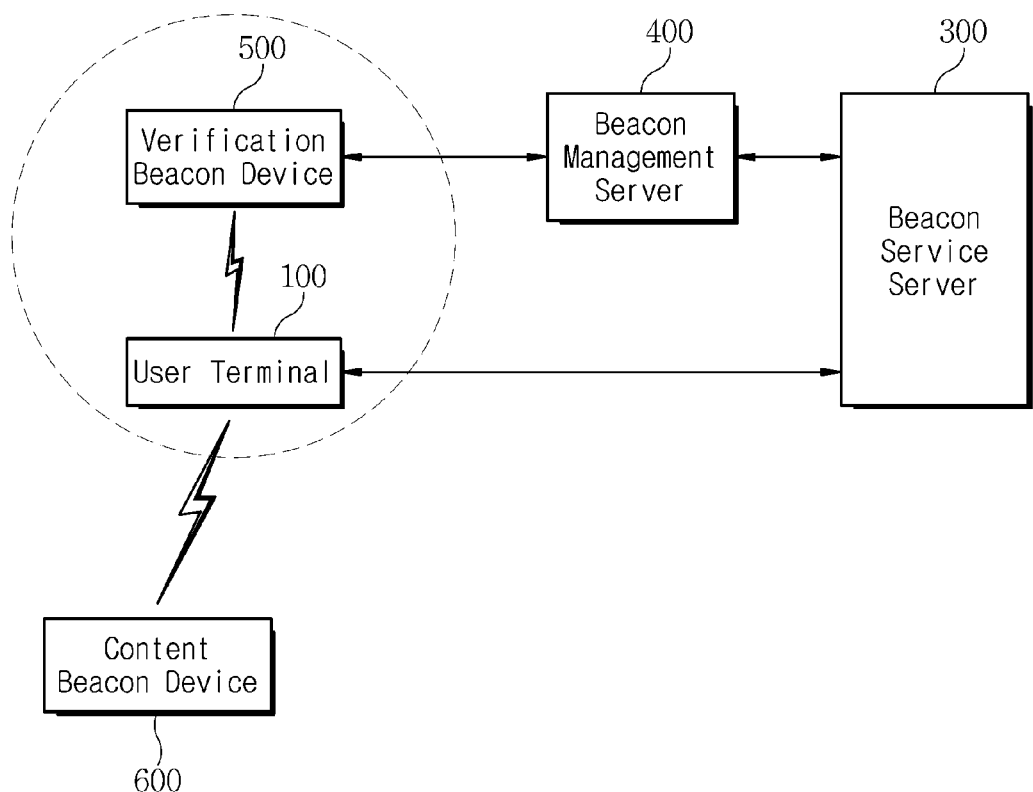
FIG. 1 is a block diagram showing a configuration of a system for verifying the validity of a beacon signal according to an embodiment of the present invention.

Hereinafter, exemplary embodiments of the present invention will be described in detail with reference to the accompanying drawings. The features and advantages of aspects of the present invention will become more apparent from the detailed description set forth below.

However, detailed descriptions related to well-known functions or configurations will be ruled out in order not to unnecessarily obscure the subject matter of the present invention. In addition, it should be noted that like reference numerals denote like elements throughout the specification and drawings.

The terms or words used in the following description and drawings should not be construed as being limited to typical or dictionary meanings, but should be construed as the meaning and concept corresponding to the technical idea of the present invention on the basis of the principle that an inventor can appropriately define the concept of the term for describing his or her invention in the best manner. Accordingly, the configurations illustrated in embodiments and drawings described in the specification do not represent the technical idea of the present invention but are just exemplary embodiments. Thus, it should be understood that various equivalents and modifications may exist which can be replaced at the time of filing an application.

While the terms including an ordinal number, such as "first," "second," etc. may be used herein to describe various elements, such elements are not limited to those terms. For example, a first component may be named a second component without departing from the scope of the present invention and the second component may also be similarly named the first component.

In the following description, the technical terms are used only for explaining a specific exemplary embodiment while not limiting the present disclosure. An expression used in the singular encompasses the expression of the plural, unless it has a clearly different meaning in the context. It will be further understood that the terms "include," "comprise," or "have" used in this specification, specify the presence of stated features, steps, operations, components, parts, or combinations thereof, but do not preclude the presence or addition of one or more other features, numerals, steps, operations, components, parts, or combinations thereof.

Moreover, each of terms such as "unit", "part" and "module" described in the specification denotes an element for performing at least one function or operation, and may be implemented in hardware, software or the combination of hardware and software. The use of the terms "a" and "an" and "the" and similar referents in the context of describing embodiments (especially in the context of the following claims) are to be construed to include both the singular and the plural, unless otherwise stated herein or clearly contradicted by the context In addition to the above-described terms, specific terms used herein are provided to help in understanding of the present invention, and the user of those specific terms may be replaced with other terms without departing from the technical concept of the present invention.

Embodiments within the scope of the present invention also include computer-readable media for carrying or storing computer-executable instructions and/or data structures. Such computer-readable media can be any available media that can be accessed by a general purpose or special purpose computer system. Thus, by way of example, and not limitation, the computer-readable media can include physical computer-readable storage media including RAM, ROM, EEPROM, CD-ROM or other optical disk storage, magnetic disk storage or other magnetic storage devices, or any other medium which can be used to store or deliver desired program code means in the form of computer-executable instructions, computer-readable instructions, or data structures and which can be accessed by a general purpose or special purpose computer.

In the following description and claims, the term "network" is defined as one or more data links that allow electronic data to be transmitted between computer systems and/or modules. When information is transferred or provided over a network or another communications connection (either hardwired, wireless, or a combination of hardwired or wireless) to a computer system, the computer system properly views the connection as a computer-readable medium. The computer-readable instructions include, for example, any instructions and data which cause a general purpose computer system or special purpose computer system to perform a certain function or group of functions. The computer-executable instructions may be, for example, binaries, intermediate format instructions such as assembly language, or even source code.

Furthermore, those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In addition, a beacon service according to an embodiment of the present invention will be described based on Bluetooth low energy (BLE) type data communication technology.

While NFC technology may be available only within several tens of centimeters, Bluetooth technology may operate in the range of several meters and thus has been applied to a wide variety of applications. In particular, the Bluetooth technology can transfer data even when a user just passes through a place where a beacon device is installed without needing to approach and then touch a reader like in NFC technology, and also can read detailed location movement inside a building and transfer customized data.

However, a beacon service according to an embodiment of the present invention is not necessarily limited to Bluetooth low energy (BLE) or Bluetooth. Accordingly, various personal area network (PAN) type short-distance communication technologies such as Zigbee, ultra wideband (UWB), ANT, and Wi-Fi may be available.

An apparatus for verifying the validity of a beacon signal in a beacon service system according to an embodiment of the present invention will be described in detail with reference to the drawings.

First, a structure of a beacon service system according to an embodiment of the present invention will be described schematically.

FIG. 1 is a block diagram schematically illustrating a structure of a beacon service system according to an embodiment of the present invention.

Referring to FIG. 1, a beacon service system according to an embodiment of the present invention may include a content beacon device 600 configured to transmit a beacon signal containing content information, a user terminal 100 configured to determine whether the beacon signal is valid and request a beacon service server 300 to verify the validity of the beacon signal, the beacon service server 300 configured to, upon receiving the validity verification request, generate and transmit authentication information to the user terminal 100 and request a beacon management server 400 to transmit the authentication information to the user terminal 100, the beacon management server 400 configured to receive the authentication information transmission request from the beacon service server 300 to request transmission of the authentication information, and a verification beacon device 500 configured to transmit the authentication information for a certain time.

The elements will be schematically described with reference to FIG. 1.

First, the content beacon device 600 denotes a device that periodically transmits a beacon signal for a typical beacon service. In this case, the beacon signal may include beacon identification information such as identification information or location information assigned to the content beacon device 600, and the beacon identification information is a criterion for the user terminal 100 receiving the beacon service.

The user terminal 100 according to an embodiment of the present invention denotes a user device that may transmit and receive various types of data via a communication network (not shown) according to manipulation of a user. The user terminal 100 may perform voice or data communication through the communication network (not shown), transmit and receive information to and from the beacon service server 300 through the communication network (not shown), and receive information from a beacon device such as the content beacon device 600 and the verification beacon device 500 through beacon-based communication. The user terminal 100 according to an embodiment of the present invention may include a memory that stores programs and protocols for transmitting/receiving and processing the beacon signal, a microprocessor that executes various types of programs to perform calculation and control, etc.

This user terminal 100 may preferentially access an app providing apparatus (not shown) connected to a communication network (not shown), for example, an app store, receive a beacon signal from the app store, and receive and install a beacon service app showing content corresponding to the beacon signal. The user terminal 100 may execute the beacon service app, extract beacon identification information from the beacon signal, transmit the extracted beacon identification information to the beacon service server 300, receive content (e.g., corresponding advertisement information or coupon of a member shop) mapped to the beacon identification information from the beacon service server 300, and provide the received content to the user.

In this case, upon receiving the beacon signal from the content beacon device 600, the user terminal 100 according to an embodiment of the present invention may verify whether the received beacon signal is valid according to an embodiment of the present invention, before performing the above-described beacon service procedure. To this end, upon receiving the beacon signal, the user terminal 100 requests the beacon service server 300 to verify validity of the beacon signal and receives the generated authentication information from the beacon service server 300. In addition, upon receiving authentication information through a nearby verification beacon device 500, the user terminal 100 compares the authentication information received from the beacon service server 300 with the authentication information received from the verification beacon device 500 to determine whether the authentication information from the beacon service server 300 and the authentication information from the verification beacon device 500 are the same. When the authentication information from the beacon service server 300 and the authentication information from the verification beacon device 500 are the same, the user terminal 100 determines that the beacon signal is valid to execute a predetermined beacon service procedure.

In this case, the beacon service may include various fields of services, which are currently provided over the wired or wireless Internet, such as a promotion page service of a member shop, a discount coupon download service, and payment service for a product purchased in the member shop.

The user terminal 100 according to an embodiment of the present invention may be implemented in various forms. For example, the user terminal described in the specification may be a stationary terminal such as a smart TV, a desktop computer, and the like as well as a mobile terminal such as a smart phone, a tablet PC, a personal digital assistant (PDA), a portable multimedia player (PMP), and an MP3 player and the like.

In accordance with the convergence trend of digital devices, there are various modifications of a mobile device, which are too many to enumerate. A unit equivalent to the above-described units may be used as the user terminal 100 according to an embodiment of the present invention. As long as any device downloads and installs a beacon service app according to an embodiment of the present invention, the device may be used as the user terminal 100 according to an embodiment of the present invention.

An operating method of the user terminal 100 to verify validity of a beacon signal will be described in more detail with reference to FIG. 6.

The verification beacon device 500 according to an embodiment of the present invention is provided to verify the validity of a beacon signal. Unlike a typical content beacon device 600, the verification beacon device 500 is configured to receive authentication information from the beacon management server 400 in addition to the authentication information transmission request and transmit a beacon signal containing the received authentication information for a certain time, instead of transmitting a beacon signal containing beacon identification information.

In this case, the content beacon device 600 and the verification beacon device 500 according to an embodiment of the present invention may be a commercially available beacon device such as iBeacon. Furthermore, as long as any device can communicate with the user terminal 100 and the beacon management server 400 described in an embodiment of the present invention in a personal area network (PAN) communication scheme, the device may be the content beacon device 600 or the verification beacon device 500.

In addition, the content beacon device 600 and the verification beacon device 500 need not be discrete devices. Instead, one beacon device may serve as the content beacon device 600 and the verification beacon device 500.

That is, one beacon device transmits both a beacon signal of the content beacon device 600 and a beacon signal of the verification beacon device 500, but the two beacon signals may be set to have different data types and intervals. Upon receiving such a beacon signal, the user terminals may check a data type of the received beacon signal and determine whether the received beacon signal is the beacon signal of the content beacon device 600 or the beacon signal of the verification beacon device 500.

In addition, a single or plurality of content beacon devices 600 and a single or plurality of verification beacon devices 500 may be installed in one member shop.

Next, the beacon management server 400 is a server apparatus for managing a plurality of beacon devices. The beacon management server 400 may be provided in a member shop side and configured to manage beacon devices installed in the member shop. Alternatively, the beacon management server 400 may be provided in a beacon service provider side and configured to separately manage beacon devices installed in respective member shops. In this case, the beacon management server 400 may map one or more of beacon identification information and a location to each of the beacon devices to manage the beacon devices. In particular, according to an embodiment of the present invention, the beacon management server 400 separately manages the verification beacon device 500 and the content beacon device 600 and transfers authentication information generated by the beacon service server 300 to the verification beacon device 500 according to control of the beacon service server 300.

The beacon service server 300 is a server apparatus for verifying the validity of a beacon signal according to an embodiment of the present invention. Furthermore, the beacon service server 300 may further perform a typical beacon service procedure of providing the user terminal 100 with content corresponding to beacon identification information extracted from a beacon signal verified to be valid.

A main configuration and an operating method of the beacon service server 300 and the beacon management server 400 according to an embodiment of the present invention will be described below.

Figure 2:
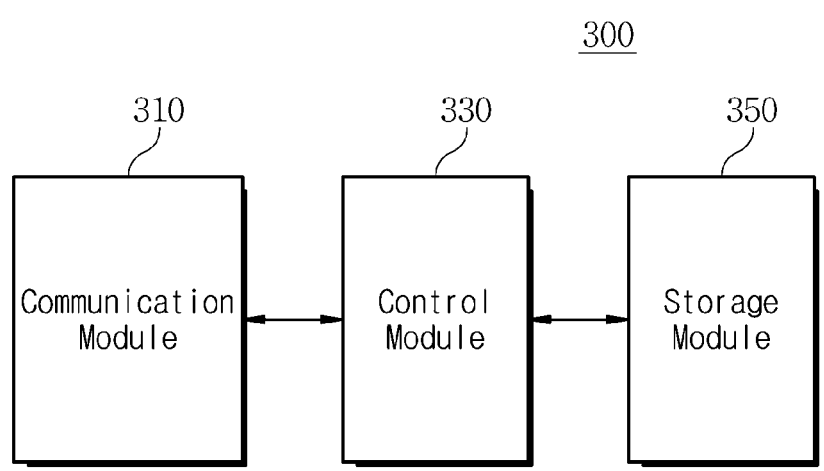
FIG. 2 is a block diagram showing a configuration of a beacon service server according to an embodiment of the present invention.
Figure 4:
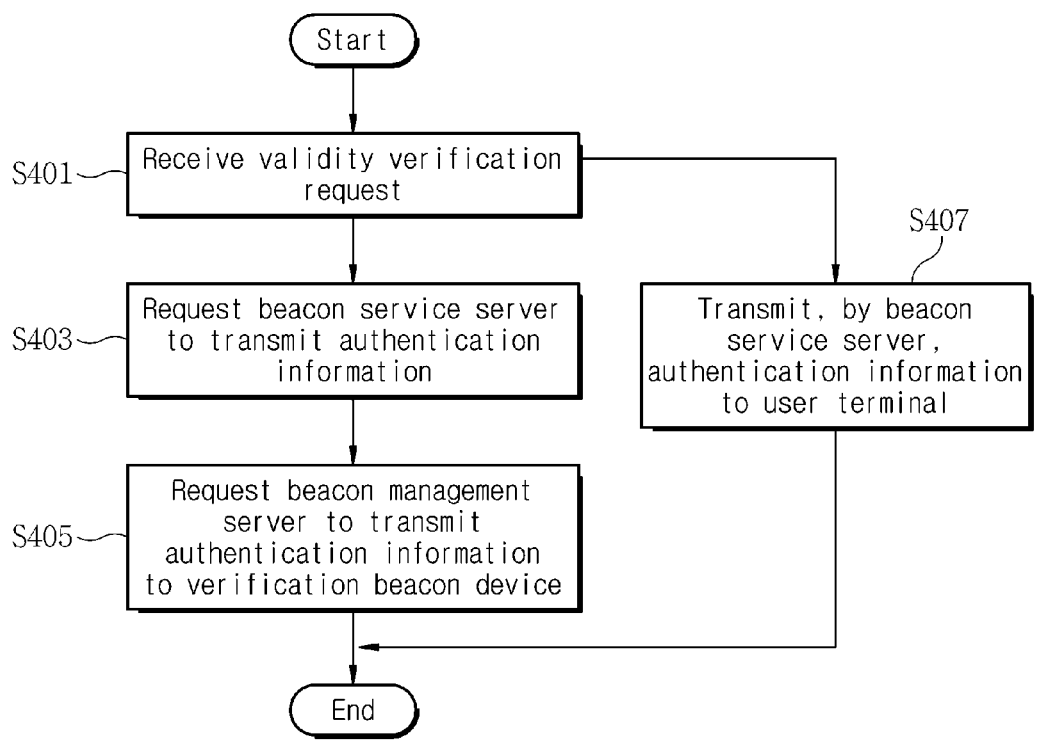
FIG. 4 is a flowchart illustrating an operating method of a beacon service server and a beacon management server according to an embodiment of the present invention.

FIG. 2 is a block diagram showing a main configuration of the beacon service server 300, and FIG. 4 is a flowchart illustrating an operating method of the beacon service server 300 and the beacon management server 400.

First, referring to FIG. 2, the beacon service server 300 according to an embodiment of the present invention includes a communication module 310, a control module 330, and a storage module 350.

The communication module 310 is configured to communicate with the user terminal 100 and the beacon management server 400 that manages beacon devices installed in member shops and including the verification beacon device 500. A communication network for allowing the communication module 310 to perform its function may utilize wireless communication such as wireless LAN (WLAN), Wi-Fi, Wibro, Wimax, and High Speed Downlink Packet Access (HSDPA), but is not limited thereto. The communication network may utilize wired communication such as Ethernet, xDSL (ADSL, VDSL), hybrid fiber coaxial cable (HFC), fiber to the curb (FTTC), and fiber to the home (FTTH) according to a system implementation scheme.

Moreover, the communication network may include, for example, a plurality of access networks (not shown) and a core network (not shown) and may further include an external network, for example, the Internet network (not shown). Here, each of the access networks (not shown) performs wired/wireless communication with the user terminal 100 and may be implemented with a plurality of base stations (BSs) such as a base transceiver station (BTS), a NodeB, and an eNodeB and a base station controller (BSC) such as a radio network controller (RNC). In addition, as described above, a digital signal processing unit and a wireless signal processing unit that were integrally implemented in the base station are separated into a digital unit (hereinafter referred to as a DU) and a radio unit (hereinafter referred to as an RU), respectively. A plurality of RUs (not shown) may be installed in a plurality of regions and may be connected with a centralized DU (not shown).

In addition, the core network (not shown) constituting a mobile network along with the access network (not shown) serves to connect the access network (not shown) with an external network, for example, the Internet network (not shown).

As described above, the core network (not shown) is a network system that performs a main function for mobile communication service such as mobility control and switching between the access networks (not shown) and is configured to perform circuit switching or packet switching and manage and control packet flow in the mobile network. In addition, the core network (not shown) may serve to manage mobility between frequencies and interoperate between traffic in the access network (not shown) and the core network (not shown) and another network, for example, the Internet network (not shown). The core network (not shown) may further include a serving gateway (SGW), a PDN gateway (PGW), a mobile switching center (MSC), a home location register (HLR), a mobile mobility entity (MME), and a home subscriber server (HSS).

In addition, the Internet network (not shown) denotes a typical open communication network through which information is exchanged according to a TCP/IP protocol, that is, a public network and may be connected with the beacon service server 300 and the beacon management server 400 and configured to provide information provided from the beacon service server 300 and the beacon management server 400 to the user terminal 100 and the verification beacon device 500 via the core network (not shown) and the access network (not shown) and provide information provided from the user terminal 100 and the verification beacon device 500 to the beacon service server 300 and the beacon management server 400 via the core network (not shown) and the access network (not shown). However, embodiments of the present invention are not limited thereto. The beacon service server 300 and the beacon management server 400 may be implemented integrally with the core network (not shown).

In addition to the above communication schemes, the beacon service server 300 and the beacon management server 400 may also include any other communication schemes that are widely known or will be developed in the future.

When a validity verification request for the content beacon device 600 is received from the user terminal 100, the control module 330 transmits authentication information for the validity verification to the user terminal 100 and simultaneously performs control such that the authentication information is transferred to the user terminal 100 through the verification beacon device 500 installed in a member shop and corresponding to the content beacon device 600.

When the control module 330 receives the validity verification request, the control module 330 may generate authentication information for the validity verification, which is matched to the content beacon device 600. In this case, the authentication information may be fixed authentication information that is matched to a particular content beacon device 600 or may be one-time authentication information that changes the authentication information matched to the content beacon device 600 whenever the validity verification request is received.

The control module 330 analyzes beacon identification information that is received from the user terminal 100 when the validity verification request is received and checks whether there is a member shop corresponding to the content beacon device 600 that has transmitted the beacon signal. When there is the member shop, the control module 330 performs control such that at least one of authentication information generated by the control module and user information is transmitted to the user terminal 100 and the beacon management server 400 of the member shop. When there is not the member shop, the control module performs control such that neither the authentication information nor the user information is transmitted.

The presence of the member shop may be determined by determining whether there is a member shop mapped to beacon identification information extracted from a content beacon signal.

In addition, the storage module 350 stores mapping information between the content beacon device and the member shop and the authentication information.

More specifically with further reference to FIG. 4, the beacon service server 300 receives a beacon signal validity verification request from the user terminal 100 (S401).

In this case, the beacon service server 300 may also receive user information matched to the user terminal 100 from the user terminal 100.

Upon receiving the beacon signal validity verification request, the beacon service server 300 transmits at least one of the user information and authentication information generated by the beacon service server 300 to the beacon management server 400 and requests the beacon management server 400 to transmit at least one of the user information and the authentication information to the user terminal 100 (S403).

Simultaneously, the beacon service server 300 transmits the generated authentication information to the user terminal (S407).

When the beacon management server 400 receives a transmission request from the beacon service server 300, the verification beacon device 500 is requested by the beacon management server to transmit at least one of the authentication information and the user information and transmits at least one of the authentication information and the user information (S405).

The configuration and the operating method of the beacon service server 300 and the beacon management server 400 according to an embodiment of the present invention has been described above.

A main configuration and an operating method of the user terminal 100 according to an embodiment of the present invention will be described below.

Figure 3:
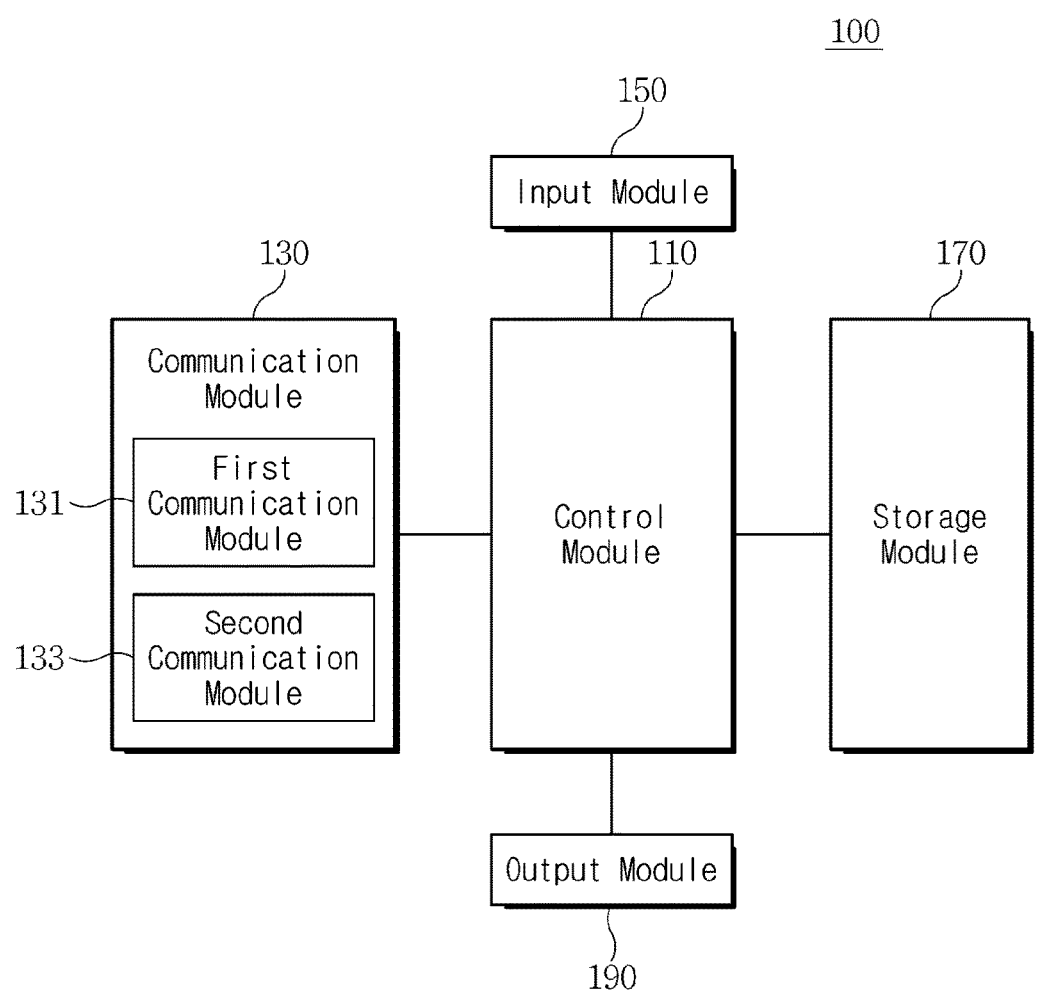
FIG. 3 is a block diagram showing a configuration of a user terminal according to an embodiment of the present invention.
Figure 5:
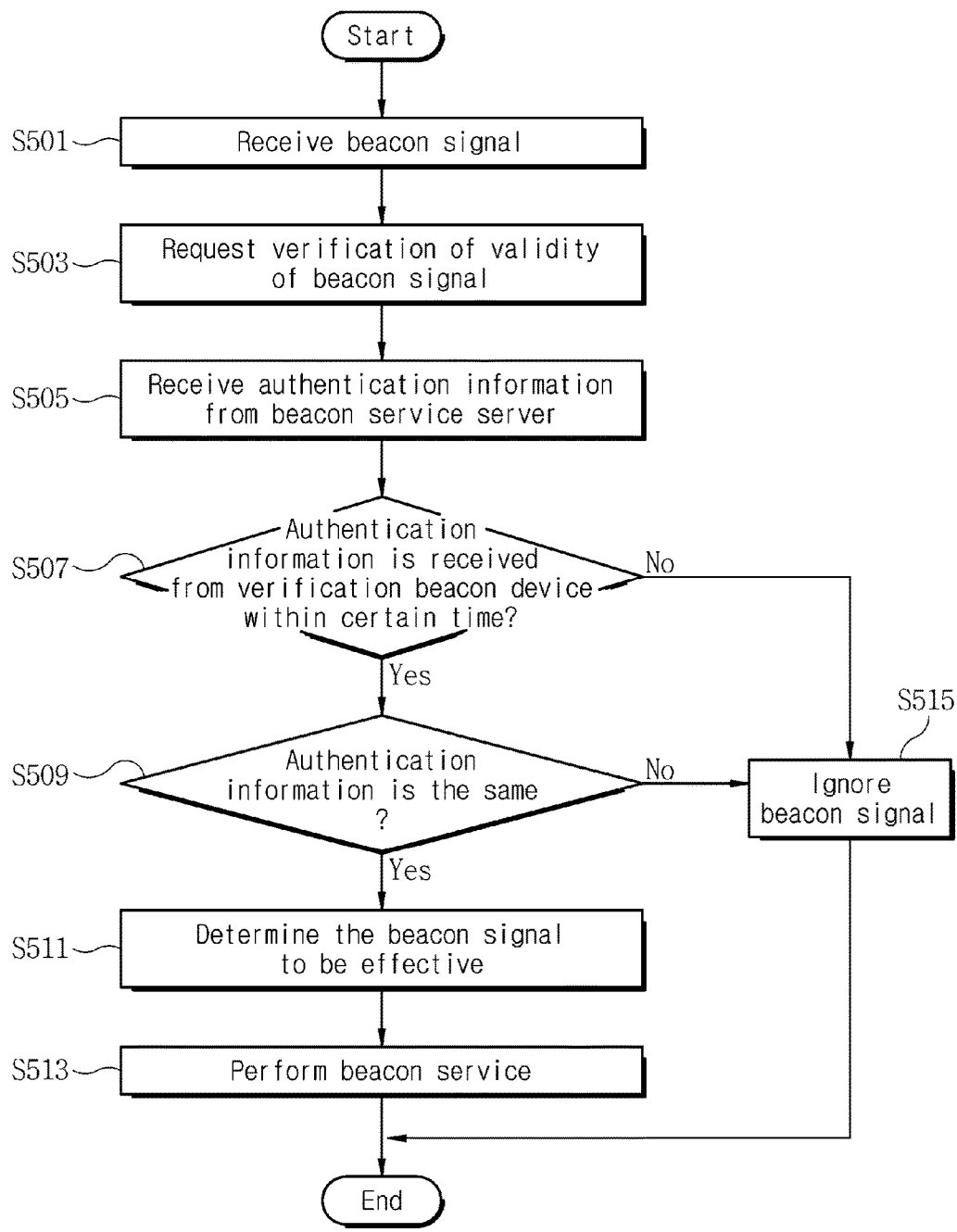
FIG. 5 is a flowchart illustrating an operating method of a user terminal according to an embodiment of the present invention.

FIG. 3 is a block diagram showing a main configuration of the user terminal 100, and FIG. 5 is a flowchart illustrating an operating method of the user terminal 100.

First, referring to FIG. 3, the user terminal 100 according to an embodiment of the present invention includes a control module 110, a communication module 130, an input module 150, a storage module 170, and an output module 190. Here, the communication module 130 includes a first communication module 131 and a second communication module 133.

When a beacon signal transmitted from the content beacon device 600 is received through the first communication module 131, the control module 110 transmits a validity verification request for the content beacon device 600 to the beacon service server 300 through the second communication module 133 and then compares any least one of authentication information and user information received through the second communication module 133 with at least one of authentication information and user information received from the verification beacon device 500 through the first communication module 131 to determine the validity of the beacon signal according to whether the information received through the second communication module 133 and the information received through the first communication module 131 are the same.

In addition, the control module 110 may be a processing device that drives an operating system (OS) and each element.

The first communication module 131 receives a signal transmitted from the content beacon device 600 and the verification beacon device 500. Here, the first communication module 131 performs personal area network (PAN) type communication including Bluetooth, as described above.

Here, the first communication module may determine whether a beacon signal received is a beacon signal received from the content beacon device 600 or a beacon signal received from the verification beacon device 500 through beacon identification information of the received beacon signal.

The second communication module 133 communicates with the beacon service server 300 over a communication network. Here, as described above, the second communication module 133 utilize wireless communication such as wireless LAN (WLAN), Wi-Fi, Wireless broadband (Wibro), World Interoperability for Microwave Access (Wimax), and High Speed Downlink Packet Access (HSDPA).

In addition, the first communication module 131 and the second communication module 133 include an RF transmission unit configured to up-convert and amplify a frequency of a transmitted signal, an RF reception unit configured to low-noise-amplify a received signal and down-convert the frequency. The communication module 130 may include at least one of a wireless communication module (not shown) and a wired communication module (not shown). The wireless communication module is configured to transmit and receive data according to a wireless communication method. When the user terminal 100 utilizes wireless communication, the wireless communication module may use any one of a wireless communication module, a wireless LAN communication module, and a wireless PAN communication module to transmit and/or receive data to and/or from the beacon service server 300, the verification beacon device 500, and the content beacon device 600.

The input module 150 receives a variety of information such as number and character information and delivers, to the control module 110, a signal that is input in relation to setting of various functions and controlling of functions of the user terminal 100. In addition, the input module 150 may include at least one of a keypad and a touchpad, which generate an input signal according to a touch or manipulation of a user. In this case, the input module 150 may be configured as one touch panel (or touch screen) together with the output module 190 to be described below and may perform an input function and also a display function. For example, the input module 150 may include any type of input unit to be developed in the future, in addition to an input device such as a keyboard, a keypad, a mouse, and a joystick. In particular, the input module 150 according to an embodiment of the present invention senses input information that is input from a user and delivers the sensed input information to the control module 110.

The storage module 170 is a device for storing data, includes a main memory device and an auxiliary memory device, and stores an application program needed to operate a function of the user terminal 100. The storage module 170 may largely include a program area and a data area. Here, when each function is activated corresponding to a user's request, the user terminal 100 executes a corresponding application program under the control of the control module 110 to provide the function.

In particular, the storage module 170 according to an embodiment of the present invention may store an operating system that boots the user terminal 100, a program for checking a beacon signal, a beacon service app, user information matched to the user terminal 100, etc.

Figure 13A:
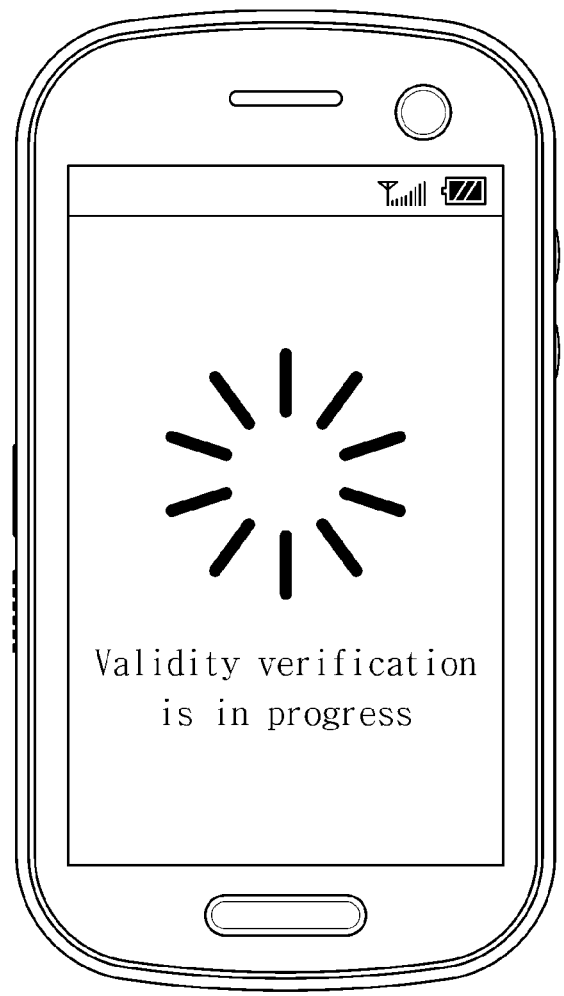
FIGS. 13a and 13b are views showing a screen of a user terminal according to an embodiment of the present invention.
Figure 13B:
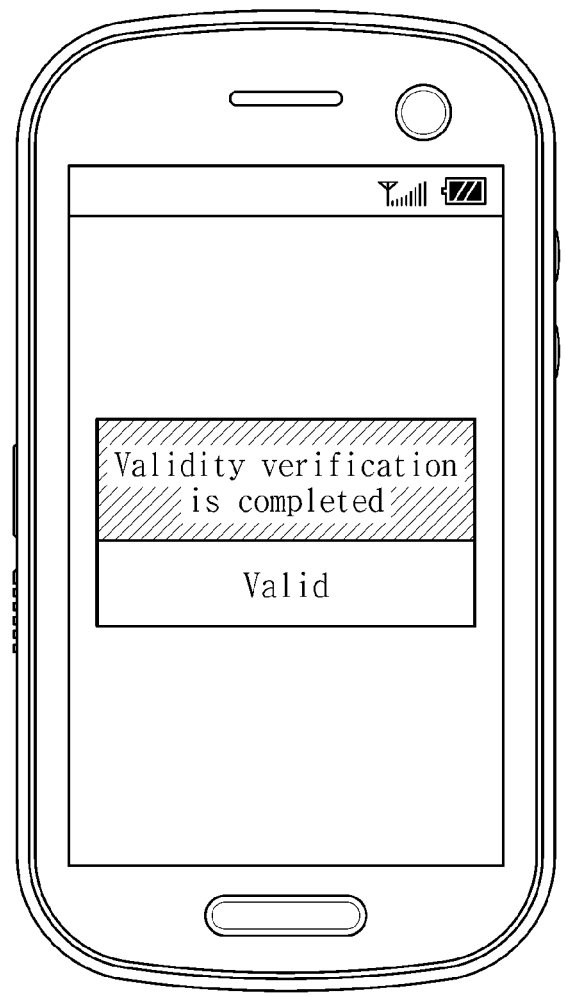

The output module 190 displays information about a series of operation states and operation results which are generated while functions of the user terminal 100 are performed. In addition, the output module 190 may display a menu of the user terminal 100, user data input by the user, etc. Here, the output module 190 may include a liquid crystal display (LCD), a thin film transistor LCD (TFT-LCD), a light emitting diode (LED), an organic light emitting diode (OLED), an active matrix organic LED (AMOLED), a retina display, a flexible display, and a three-dimensional display. In this case, when the output module 190 is configured in the form of a touch screen, the output module 190 may perform some or all of the functions of the input module 150. In particular, the output module 190 according to an embodiment of the present invention outputs an execution screen obtained by executing the beacon service app and a status of a beacon signal whose validity is being verified, for example, 'Validity verification is in progress" or "Valid" as shown in FIGS. 13A and 13B.

More specifically with further reference to FIG. 5, when the user terminal 100 receives a beacon signal from the content beacon device 600 (S501), the user terminal 100 requests the beacon service server 300 to verify the validity of the beacon signal and transmits beacon identification information extracted from the beacon signal (S503). In this case, the user terminal 100 may also transmit user information matched to the user terminal 100. Next, the user terminal 100 receives authentication information from the beacon service server 300 (S505). Subsequently, when at least one of authentication information and user information is received from the verification beacon device 500 within a certain time (S507), the user terminal 100 compares the received information with authentication information or user information stored therein to determine whether the received information and the stored information are the same (S509). When the received information and the stored information are the same, the user terminal 100 determines that the beacon signal received from the content beacon device 600 is valid (S511) and performs a beacon service mapped to the beacon signal (S513).

Although not shown, when the user terminal 100 compares the prestored user information with the user information received from the verification beacon device 500 to determine that the prestored user information and the received user information are the same, the method may further include determining whether the authentication information received from the beacon service server 300 and the authentication information received from the verification beacon device 500 are the same.

In addition, when the prestored user information and the received user information are not the same or when the user terminal 100 does not receive the authentication information or user information from the verification beacon device 500 within a certain time, the user terminal 100 determines that the beacon signal received from the content beacon device 600 is not valid and ignores the beacon signal (S515).

From when the user terminal 100 receives the beacon signal from the content beacon device 600 until the user terminal 100 determines whether the authentication information received from the verification beacon device 500 and the authentication information received from the beacon service server 300 are the same, the user terminal output module 190 may display a status of "Validity verification is in progress" as shown in FIG. 13A. When the authentication information received from the verification beacon device 500 and the authentication information received from the beacon service server 300 are the same, the user terminal output module 190 may display a status of "Valid" along with a message of "Validity verification is completed" as shown in FIG. 13B.

The configuration and the operating method of the user terminal 100 according to an embodiment of the present invention have been described above.

An operating method of the verification beacon device 500 according to an embodiment of the present invention will be described below.

Figure 6:
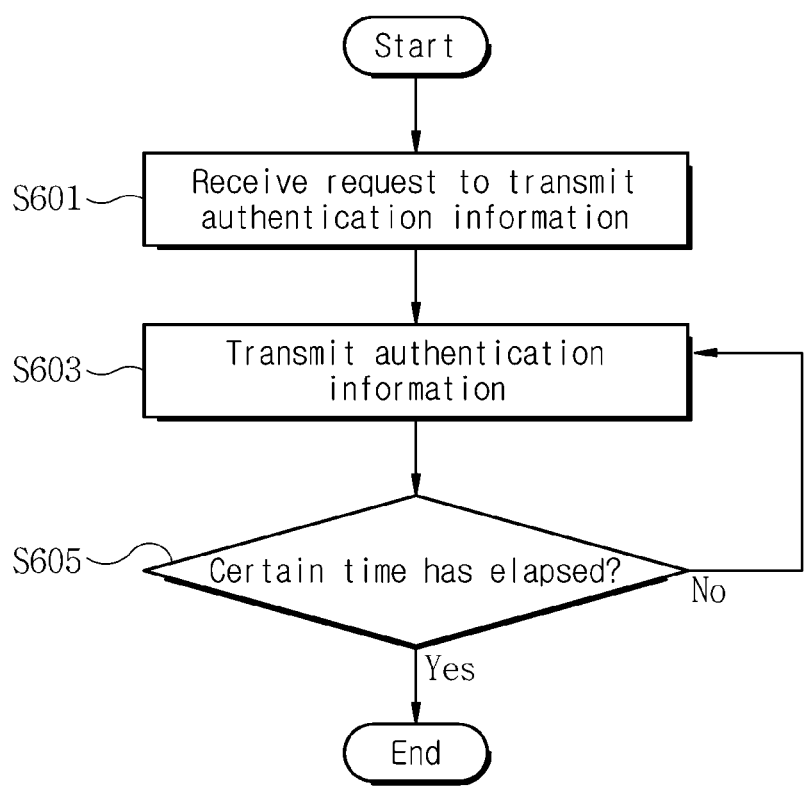
FIG. 6 is a flowchart illustrating an operating method of a verification beacon device according to an embodiment of the present invention.

FIG. 6 is a flowchart illustrating an operating method of the verification beacon device 500.

Referring to FIG. 6, the verification beacon device 500 receives at least one of user information and authentication information from the beacon management server 400 and is requested to transmit at least one of the user information and the authentication (S601). The requested verification beacon device 500 transmits the at least one of the authentication information and the user information (S603). In this case, the verification beacon device 500 may separately transmit the user information and the authentication information in different types of data frames.

That is, for iBeacon, for example, the verification beacon device 500 may transmit the beacon identification information, user information, and authentication information in a universally unique identifier (UUID), major field, and minor field, respectively. Embodiments of the present invention are not limited to iBeacon. It will be appreciated that, as long as any device transmits and receives a beacon signal in a personal area network (PAN) scheme, the device may separately transmit the user information and the authentication information in different types of data frames.

The verification beacon device 500 transmits at least one of the authentication information and the user information for a certain time and stops the transmission of the information after the time elapses (S605). In this case, the transmission of at least one of the authentication information and the user information for the certain time may be continuous or periodic.

The operating method of the verification beacon device 500 according to an embodiment of the present invention has been described above.

A beacon signal validity verification step according to an embodiment of the present invention in a case where a valid beacon signal is transmitted from the content beacon device 600 will be described below.

Figure 7:
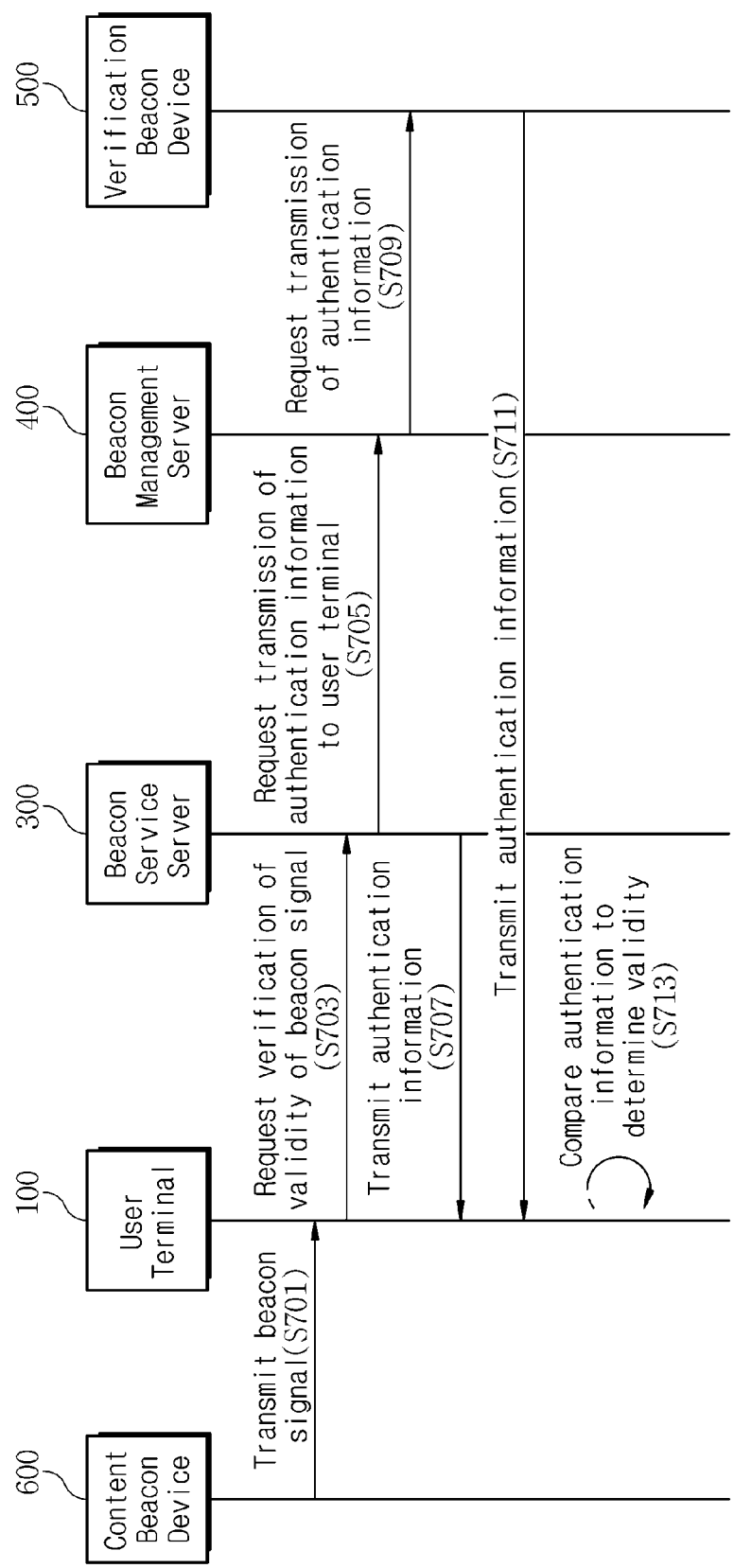
FIG. 7 is a sequence diagram illustrating validity verification when a valid beacon signal is transmitted from a content beacon device to a user terminal according to an embodiment of the present invention.

FIG. 7 is a sequence diagram illustrating a beacon signal validity verification step in a case where a valid beacon signal is transmitted.

Referring to FIG. 7, when the user terminal 100 receives a beacon signal containing certain beacon information from the content beacon device 600 (S701), the user terminal 100 requests the beacon service server 300 to verify the validity of the beacon signal and transmits beacon information matched to the beacon signal and user information matched to the user terminal 100 (S703). Subsequently, the beacon service server 300 transmits the authentication information to the user terminal 100 (S707) and simultaneously requests the beacon management server 400 to transmit authentication information to the user terminal 100 (S705). In this case, the beacon service server 300 transmits at least one of the authentication information and the user information to the beacon management server 400.

The beacon management server 400 requested to transmit the authentication information transmits at least one of the authentication information and the user information to the verification beacon device 500 and requests the verification beacon device 500 to transmit at least one of the authentication information and the user information (S709). The requested verification beacon device 500 transmits the authentication information for a certain time (S711).

The user terminal 100, which is located within a communication range of the verification beacon device 500, receives at least one of the authentication information and the user information transmitted by the verification beacon device 500 and compares the received information with at least one of user information of the user terminal 100 stored in the storage module 170 of the user terminal 100 and authentication information received from the beacon service server 300. When the received information and the prestored user information or the authentication information received from the beacon service server 300 are the same, the user terminal 100 determines that the beacon signal is valid (S713).

Although not shown, as described above, when the beacon service server 300 is requested to verify validity and transmits authentication information, the authentication information may be generated by the control module 330 of the beacon service server, and the authentication information may be one-time authentication information. In addition, when the beacon service server 300 is requested to verify validity, the beacon service server 300 inspects beacon identification information of the beacon signal transmitted from the content beacon device 600 to check whether there is a member shop corresponding to the content beacon device 600. When there is the member shop, the beacon service server 300 may transmit at least one of the authentication information and the user information. On the other hand, when there is not the member shop, the beacon service server 300 may transmit neither the authentication information nor the user information.

The beacon signal validity verification step according to an embodiment of the present invention in a case where a valid beacon signal is transmitted from the content beacon device 600 has been described above.

A beacon signal validity verification step according to an embodiment of the present invention in a case where an invalid beacon signal is transmitted from the content beacon device 600, that is, in a case where a third party maliciously sends a beacon signal containing information about another member shop to the user terminal 100 or the user terminal 100 receives an undesired beacon signal from the content beacon device 600 of another member shop instead of a member shop where the user terminal 100 is located because of overlapping between communication ranges will be described below.

Figure 8:
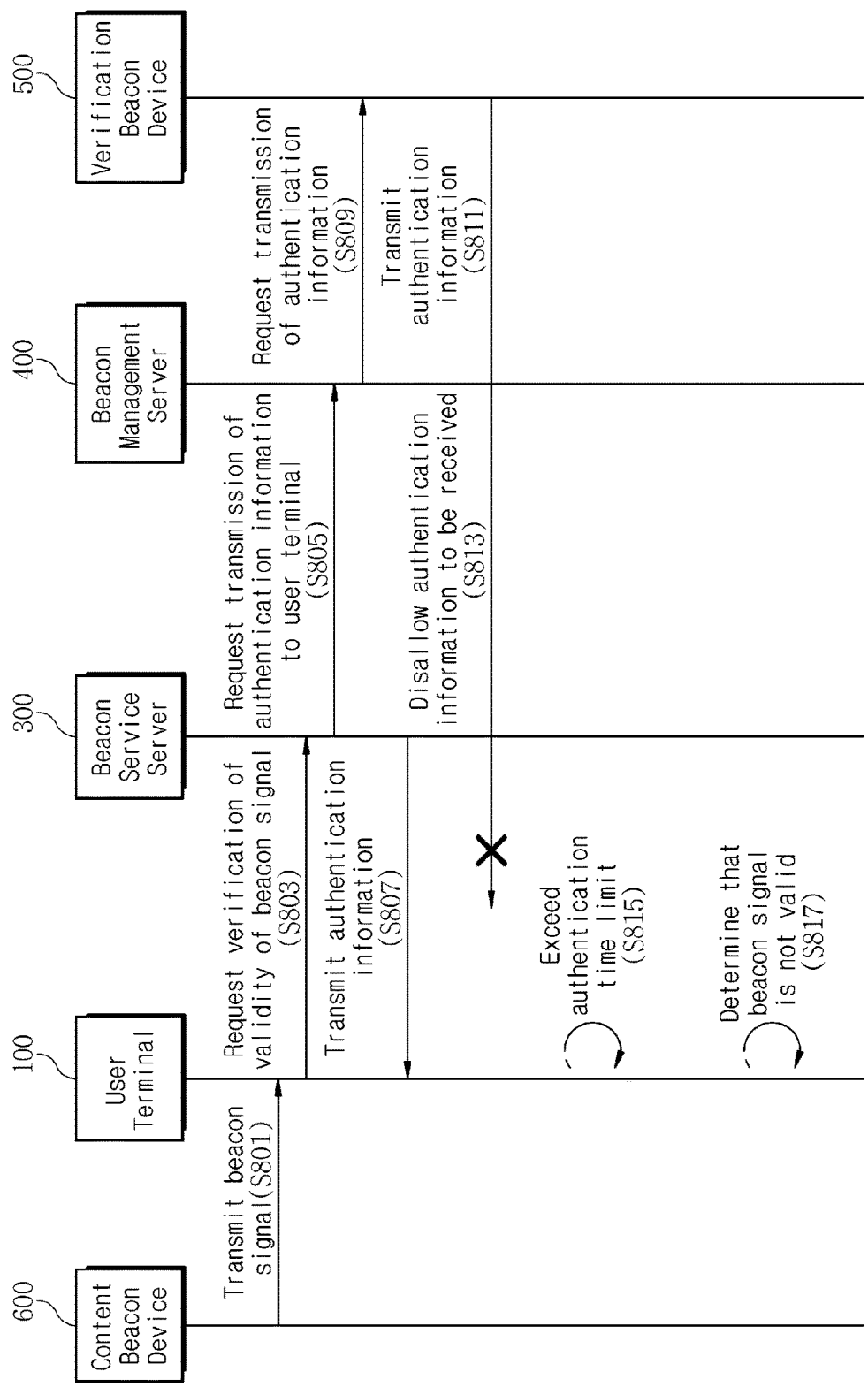
FIG. 8 is a sequence diagram illustrating validity verification when an invalid beacon signal is transmitted from a content beacon device to a user terminal according to an embodiment of the present invention.

FIG. 8 is a sequence diagram illustrating a step of verifying the validity of a transmitted beacon signal when the beacon signal is not valid.

Referring to FIG. 8, when the user terminal 100 receives a beacon signal containing certain beacon information from the content beacon device 600 (S801), the user terminal 100 requests the beacon service server 300 to verify the validity of the beacon signal and transmits beacon information matched to the beacon signal and user information matched to the user terminal 100 (S803). Subsequently, the beacon service server 300 transmits the authentication information to the user terminal 100 (S807) and simultaneously requests the beacon management server 400 to transmit the authentication information to the user terminal 100 (S805). In this case, the beacon service server 300 transmits at least one of the authentication information and the user information to the beacon management server 400.

The beacon management server 400 requested to transmit the authentication information transmits at least one of the authentication information and the user information to the verification beacon device 500 and requests the verification beacon device 500 to transmit at least one of the authentication information and the user information (S809). The requested verification beacon device 500 transmits the authentication information for a certain time (S811).

The user terminal 100, which is positioned outside a communication range of the verification beacon device 500 cannot receive the authentication information and the user information transmitted by the verification beacon device 500 (S813). Accordingly, since the user terminal 100 does not receive any information matching the authentication information or user information stored therein for a predetermined time, the user terminal 100 exceeds an authentication time limit (S815) and determines that the beacon signal received from the content beacon device 600 is not valid (817).

Although not shown, as described above, when the beacon service server 300 is requested to verify validity and transmits authentication information, the authentication information may be generated by the control module 330 of the beacon service server, and the authentication information may be one-time authentication information. In addition, when the beacon service server 300 is requested to verify validity, the beacon service server 300 inspects beacon identification information of the beacon signal transmitted from the content beacon device 600 to check whether there is a member shop corresponding to the content beacon device 600. When there is the member shop, the beacon service server 300 may transmit at least one of the authentication information and the user information. On the other hand, when there is not the member shop, the beacon service server 300 may transmit neither the authentication information nor the user information.

The beacon signal validity verification step according to an embodiment of the present invention in a case where an invalid beacon signal is transmitted from the content beacon device 600 has been described above.

A beacon signal validity verification step according to an embodiment of the present invention in a case where, when the user terminal 100 enters member shop A, the user terminal 100 receives a beacon signal of member shop A from the content beacon device 600 of member shop A will be described below.

Figure 9:
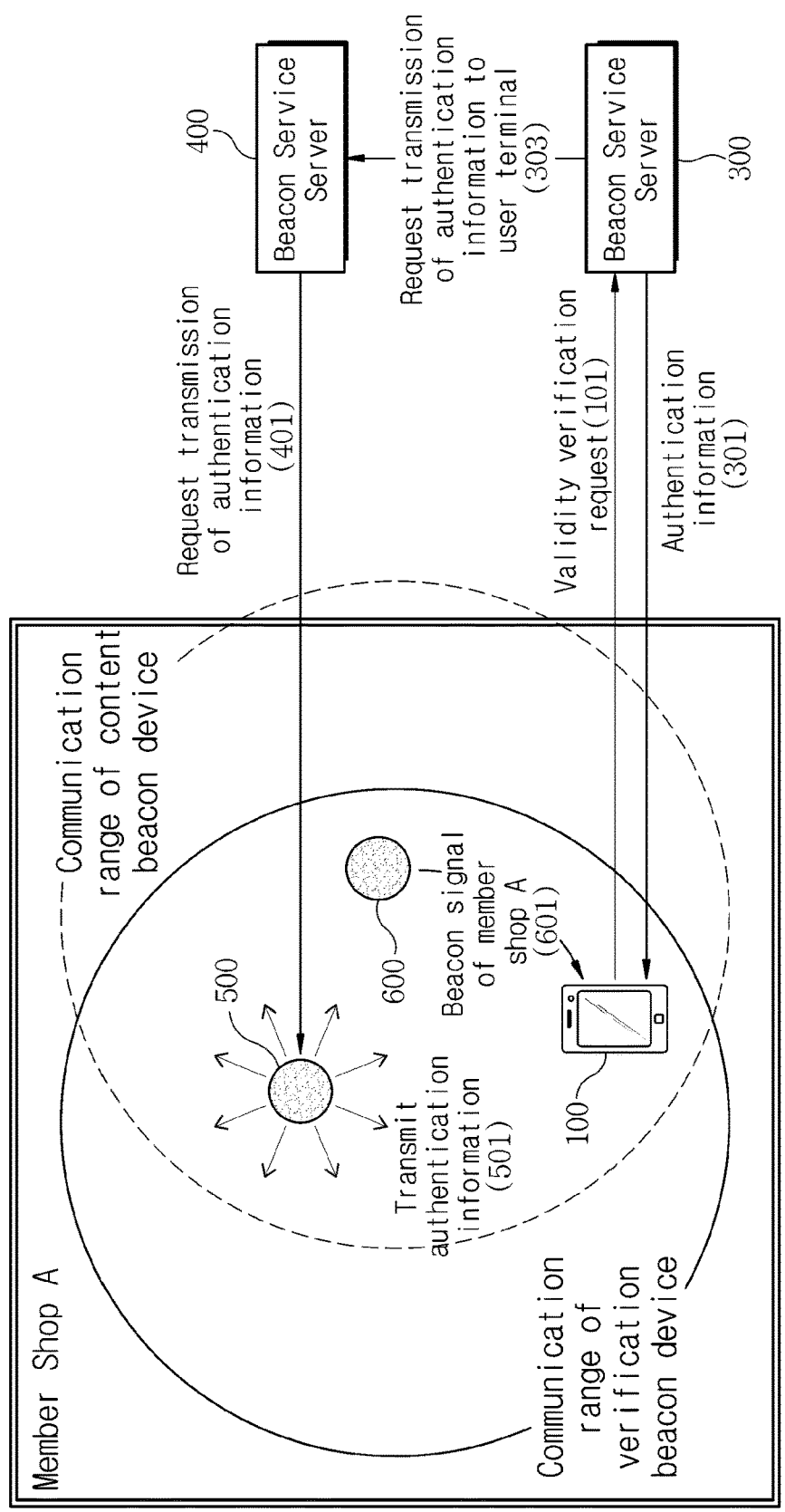
FIG. 9 is a schematic diagram showing a validity verification process in a case where a user terminal receives a valid beacon signal in a member shop in a system according to an embodiment of the present invention.

FIG. 9 is a schematic diagram showing a verification process in a case where the user terminal 100 receives a valid beacon signal in member shop A.

Referring to FIG. 9, when the user terminal 100 enters the communication range of the content beacon device 600 in member shop A, the user terminal 100 receives a beacon signal 601 of member shop A. Then, the user terminal 100 requests the beacon service server 300 to verify the validity of the signal and transmits the beacon signal of member shop A. In this case, the user terminal 100 may also transmit its own user information and may change the status to "Validity verification is in progress" as shown in FIG. 13A.

The requested beacon service server 300 generates authentication information and transmits the generated authentication information to the user terminal 100 (301) and requests the beacon management server 400 to transmit the authentication information to the user terminal 100 (303). In this case, the beacon service server 300 may transmit the authentication information and the user information to the beacon management server 400.

The beacon management server 400 requested to transmit the authentication information requests the verification beacon device 500 to transmit at least one of the authentication information and the user information (401). The verification beacon device 500 transmits at least one of the user information and the authentication information for a certain time (501). When the user information and the authentication information are transmitted together, the verification beacon device 500 may contain and send the user information in major field and the authentication information in minor field.

In this case, since the user terminal 100 is located within a communication range of the verification beacon device 500, the user terminal 100 may receive a signal transmitted by the verification beacon device 500 in a certain time and compare its own user information or authentication information matched to the beacon signal of member shop A with the signal received from the verification beacon device 500. When the user information or authentication information is the same as the signal received from the verification beacon device 500, the user terminal 100 changes the status to "Valid" as shown in FIG. 13B and executes a content service matched to the beacon signal of member shop A.

The beacon signal validity verification step according to an embodiment of the present invention in a case where, when the user terminal 100 enters member shop A, the user terminal 100 receives a beacon signal of member shop A from the content beacon device 600 of member shop A has been described above.

A beacon signal validity verification step according to an embodiment of the present invention in a case where, when the user terminal 100 enters member shop A, the user terminal 100 receives a beacon signal of member shop B from a malicious user will be described below.

Figure 10:
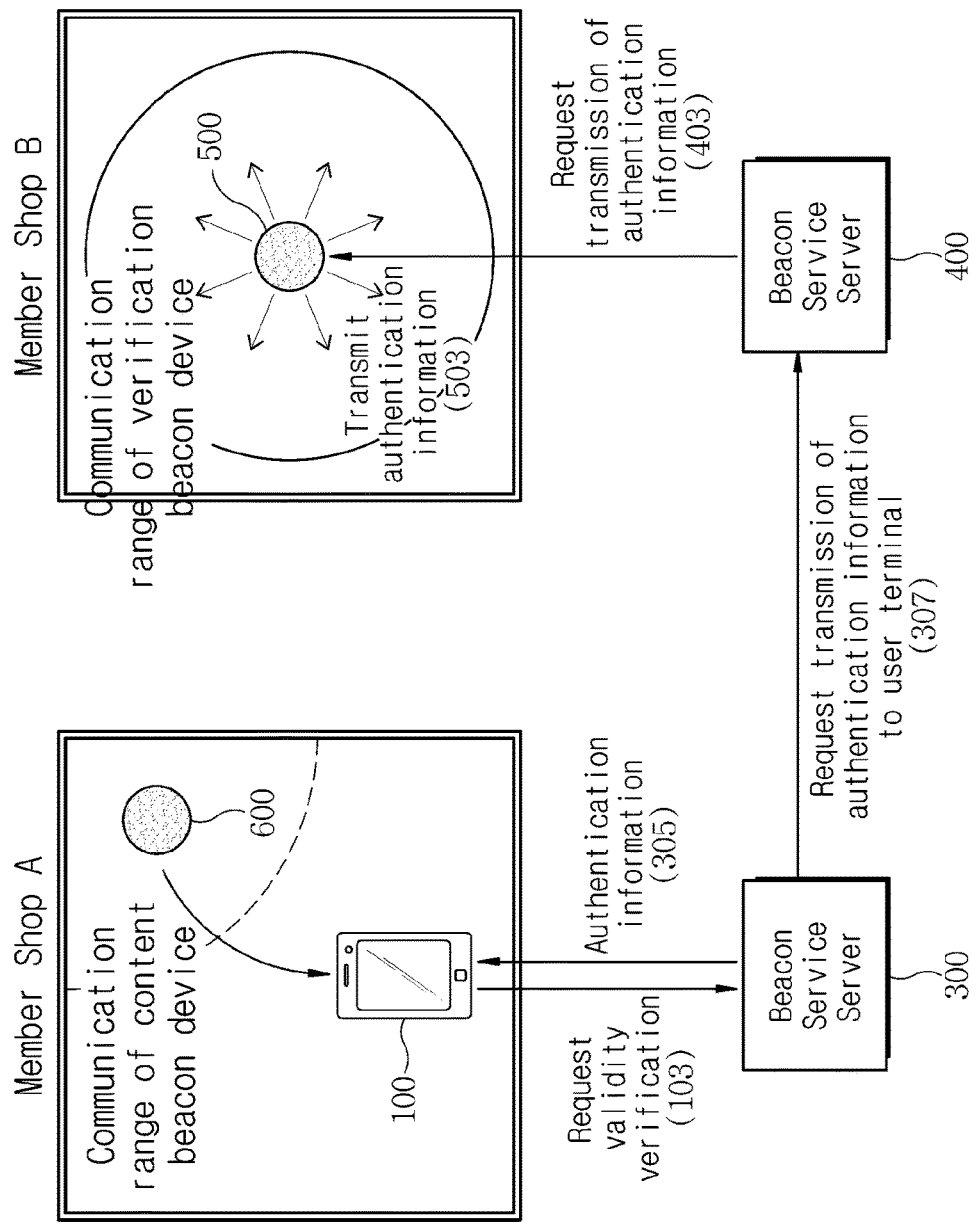
FIG. 10 is a schematic diagram showing a validity verification process in a case where a third party maliciously sends a beacon signal of another member shop to a user terminal in a system according to an embodiment of the present invention.

FIG. 10 is a schematic diagram showing a verification process in a case where the user terminal 100 receives an invalid beacon signal in member shop A.

Referring to FIG. 10, when the user terminal 100 enters member shop A, the user terminal 100 receives a beacon signal of member shop B from a third party with malicious intent. Then, the user terminal 100 requests the beacon service server 300 to verify the validity of the signal (103) and transmits the beacon signal of member shop B. In this case, the user terminal 100 may also transmit its own user information and may change the status to "Validity verification is in progress" as shown in FIG. 13A.

The requested beacon service server 300 generates authentication information and transmits the generated authentication information to the user terminal 100 (305) and requests the beacon management server 400 to transmit the authentication information to the user terminal 100 (307). In this case, the beacon service server 300 may transmit the authentication information and the user information to the beacon management server 400.

The beacon management server 400 requested to transmit the authentication information requests the verification beacon device 500 to transmit at least one of the authentication information and the user information (403). The verification beacon device 500 transmits at least one of the user information and the authentication information for a certain time (503). When the user information and the authentication information are transmitted together, the verification beacon device 500 may contain and send the user information in major field and the authentication information in minor field.

In this case, since the user terminal 100 is not located within a communication range of the verification beacon device 500, that is, the user terminal 100 is not located within member shop B, the user terminal 100 cannot receive a signal transmitted by the verification beacon device 500 within a certain time and compare its own user information or authentication information matched to the beacon signal of member shop B with the signal received from the verification beacon device 500. Furthermore, even when the user terminal 100 receives any signal, the signal is not the same as the above described information. Accordingly, the user terminal 100 ignores the beacon signal of member shop B.

The beacon signal validity verification step according to an embodiment of the present invention in a case where, when the user terminal 100 enters member shop A, the user terminal 100 receives a beacon signal of member shop B from a malicious user has been described above.

A beacon signal validity verification step according to an embodiment of the present invention in a case where, when the user terminal 100 enters member shop A, the user terminal 100 receives a beacon signal of member shop A and a beacon signal of member shop B adjacent to member shop A will be described below.

Figure 11:
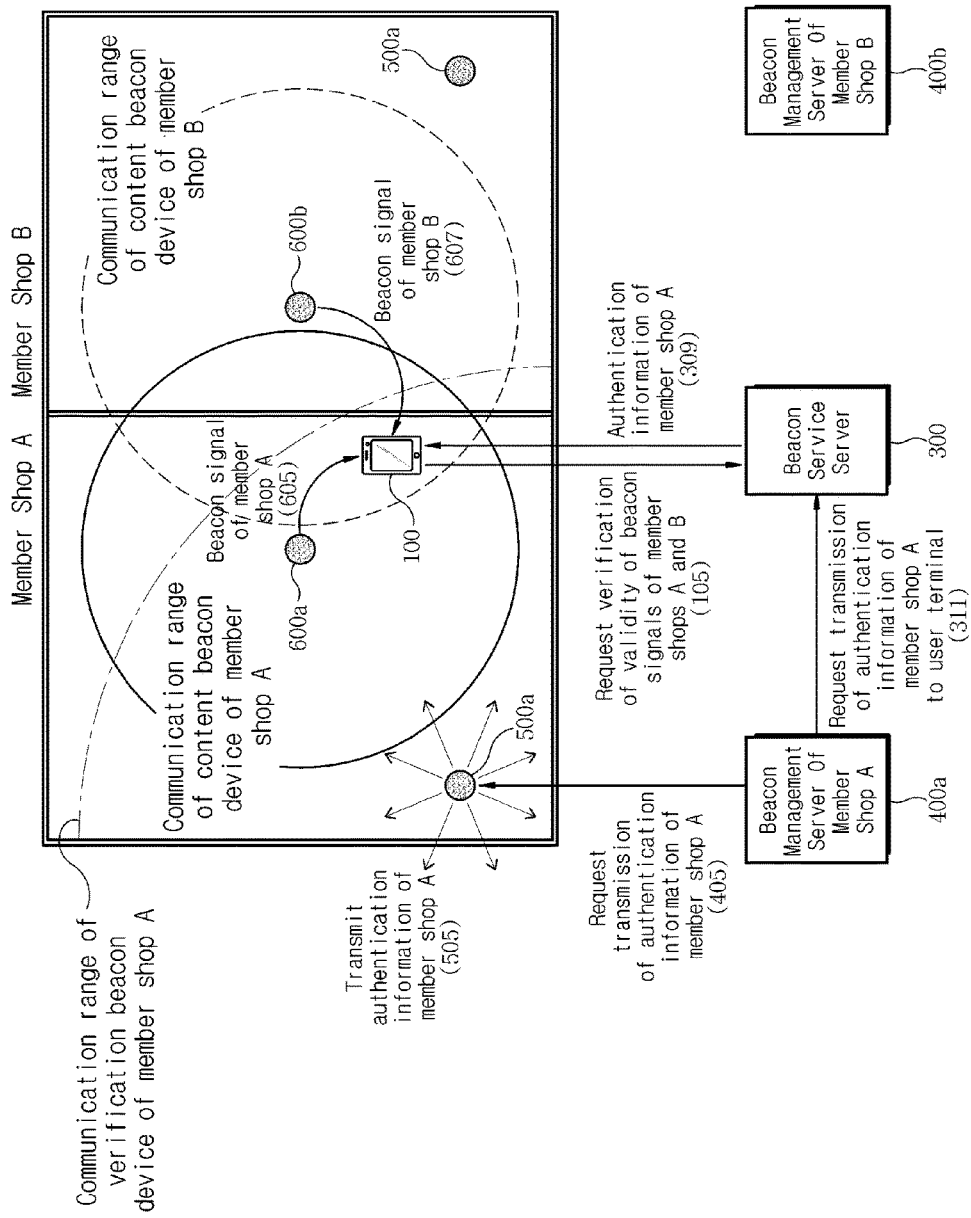
FIG. 11 is a schematic diagram showing a validity verification process in a case where a user terminal receives a plurality of valid beacon signals in a system according to an embodiment of the present invention.

FIG. 11 is a schematic diagram showing a verification process in a case where the user terminal 100 receives, in member shop A, a valid beacon signal of member shop A and a valid beacon signal of member shop B.

Referring to FIG. 11, since the user terminal 100 is located in member shop A, but enters communication ranges of a content beacon device 600a of member shop A and a content beacon device 600b of member shop B, the user terminal 100 receives a beacon signal 605 of member shop A and a beacon signal 607 of member shop B. Then, the user terminal 100 requests the beacon service server 300 to verify the validity of the two signals (105) and transmits the beacon signals of member shop A and member shop B. In this case, the user terminal 100 may also transmit its own user information and may change the status to "Validity verification is in progress" as shown in FIG. 13A.

The requested beacon service server 300 selects one of the beacon signal of member shop A and the beacon signal of member shop B and performs the validity verification step on the selected signal.

In this case, a method of the beacon service server 300 selecting one of a plurality of beacon signals may include selecting a beacon signal of a beacon device closest to the user terminal 100 from among the plurality of beacon signals on the basis of distances between the user terminal 100 and the beacon devices and selecting a beacon signal having the greatest power intensity from among the plurality of beacon signals on the basis of power intensities of the beacon signals.

In FIG. 11, the user terminal 100 is located in member shop A, and the user terminal 100 is closer to the content beacon device 600a of member shop A than to the content beacon device 600b of member shop B. In addition, a power intensity of the beacon signal received from the content beacon device 600a of member shop A is greater than a power intensity of the beacon signal received from the content beacon device 600b of member shop B. Thus, the beacon service server 300 selects the beacon signal of member shop A and performs the validity verification step on the selected signal.

Accordingly, when the beacon signal of member shop A is selected, the beacon service server 300 generates authentication information for the beacon signal of member shop A, transmits the generated authentication information to the user terminal 100 (309), and requests a beacon management server 400a of member shop A to transmit the authentication information for the beacon signal of member shop A to the user terminal 100 (311). In this case, the beacon service server 300 may transmit the authentication information and the user information to the beacon management server 400a of member shop A.

The beacon management server 400a of member shop A requested to transmit the authentication information requests a verification beacon device 500a of member shop A to transmit at least one of the authentication information and the user information (405). The verification beacon device 500a of member shop A transmits at least one of the user information and the authentication information for a certain time (505). When the user information and the authentication information are transmitted together, the verification beacon device 500 may contain and send the user information in major field and the authentication information in minor field.

In this case, since the user terminal 100 is located within a communication range of the verification beacon device 500a of member shop A, the user terminal 100 may receive a signal transmitted by the verification beacon device 500a of member shop A in a certain time and compare its own user information or authentication information matched to the beacon signal of member shop A with the signal received from the verification beacon device 500a of member shop A. When the user information or authentication information is the same as the signal received from the verification beacon device 500a, the user terminal 100 changes the status to "Valid" as shown in FIG. 13B and executes a content service matched to the beacon signal of member shop A.

For convenience of description, the beacon management server 400a of member shop A and the beacon management server 400b of member shop B have been separately described in FIG. 11. However, every member shop need not have one beacon management server 400. Instead, one beacon management server 400 may manage verification beacon devices 500 of a plurality of member shops.

That is, when several member shops operate in one building or space such as a department store or outlet, one beacon management server 400 may manage a plurality of verification beacon devices 500, thus promoting efficiency.

In addition, for convenience of description, it is assumed that one content beacon device 600 and one verification beacon device 600 are installed in one member shop. However, a plurality of content beacon devices 600 and a plurality of verification beacon devices 500 may be installed in one member shop. In this case, the plurality of beacon devices 600 installed in one shop may provide the user terminal 100 with the same or different content.

For example, the plurality of content beacon devices 600 installed in the same member shop may be separated on the basis of locations of the content beacon devices 600. The content beacon devices 600 installed around the entrance of the shop may transmit member shop information, and the content beacon devices 600 installed inside the shop may transmit coupon information of different products. Moreover, if the present invention is applied to a museum, an art gallery, etc., information about artworks may be provided according to their locations.

It will be appreciated that this description is not limited to an embodiment of the present invention corresponding to FIG. 11, but may be applied to all above-described embodiments of the present invention.

The beacon signal validity verification step according to an embodiment of the present invention in a case where, when the user terminal 100 enters member shop A, the user terminal 100 receives a beacon signal of member shop A and a beacon signal of member shop B, that is, a plurality of beacon signals has been described above.

The above-described method for verifying validity of a beacon signal in a beacon service system according to an embodiment of the present invention may be provided in the form of a computer-readable medium suitable for storing computer program instructions and data.

The programs are recorded in the computer-readable medium and are read, installed, and executed by the computer, such that the above-mentioned functions may be executed.

Here, in order for the computer to read the programs recorded in the recording medium and execute functions implemented with the programs, the above-mentioned programs may include codes which are coded with computer languages such as C, C++, JAVA, a machine language, and the like which may be read by a processor (CPU) of the computer.

The code may include a function code associated with a function defining the above-mentioned functions and may also include an execution procedure related control code required for the processor of the computer to execute the above-mentioned functions according to a predetermined procedure. In addition, the code may further include a memory reference related code indicating at which location (address number) of the memory inside or outside the computer additional information or media required for the processor of the computer to execute the above-mentioned functions needs to be referenced. Further, in order for the processor of the computer to execute the above-mentioned functions, when the processor needs to communicate with any other computers or servers, etc. at a remote location, the code may further include a communication related code about how the processor of the computer communicates with any other computers or servers at a remote location or which information or media the processor of the computer transmits and receives at the time of the communication, by using the communication module of the computer.

Examples of the computer-readable medium suitable for storing computer program instructions and data include a magnetic medium such as a hard disk, a floppy disk, and a magnetic tape, an optical medium such as a compact disk read only memory (CD-ROM), a digital video disk (DVD), etc., a magneto-optical medium such as a floptical disk, and a semiconductor memory such as a read only memory (ROM), a random access memory (RAM), a flash memory, an erasable programmable ROM (EPROM), and an electrically erasable programmable ROM (EEPROM). A processor and a memory may be supplemented by a specific purpose logic circuit or integrated into a specific purpose logic circuit.

The computer-readable recording medium can also be distributed over network coupled computer systems so that the computer-readable code is stored and executed in a distributed fashion. In addition, a functional program for implementing the present invention, a code and a code segment associated therewith, and the like may be easily inferred or changed by programmers in the art to which the present invention pertains in consideration of a system environment of the computer which reads the recording medium and executes the program.

Each step of the method according to embodiments of the present invention may be implemented with computer-readable instructions and executed by a computing system. Here, a "computing system" is defined as one or more software modules, one or more hardware modules, or combinations thereof, that work together to perform operations on electronic data. For example, the definition of computing system includes the hardware components of a personal computer, as well as software modules, such as the operating system of the personal computer. The physical layout of the modules is not important. A computing system may include one or more computers coupled via a network.

Likewise, a computing system may include a single physical device where internal modules such as a memory and processor work together to perform operations on electronic data.

That is, the apparatus for providing the beacon signal validity verification method in the beacon service system according to an embodiment of the present invention, for example, the user terminal 100, the verification beacon device 500, and the content beacon device 600 may be implemented to perform the above-described embodiments on the basis of a computing system to be described below.

Figure 12:
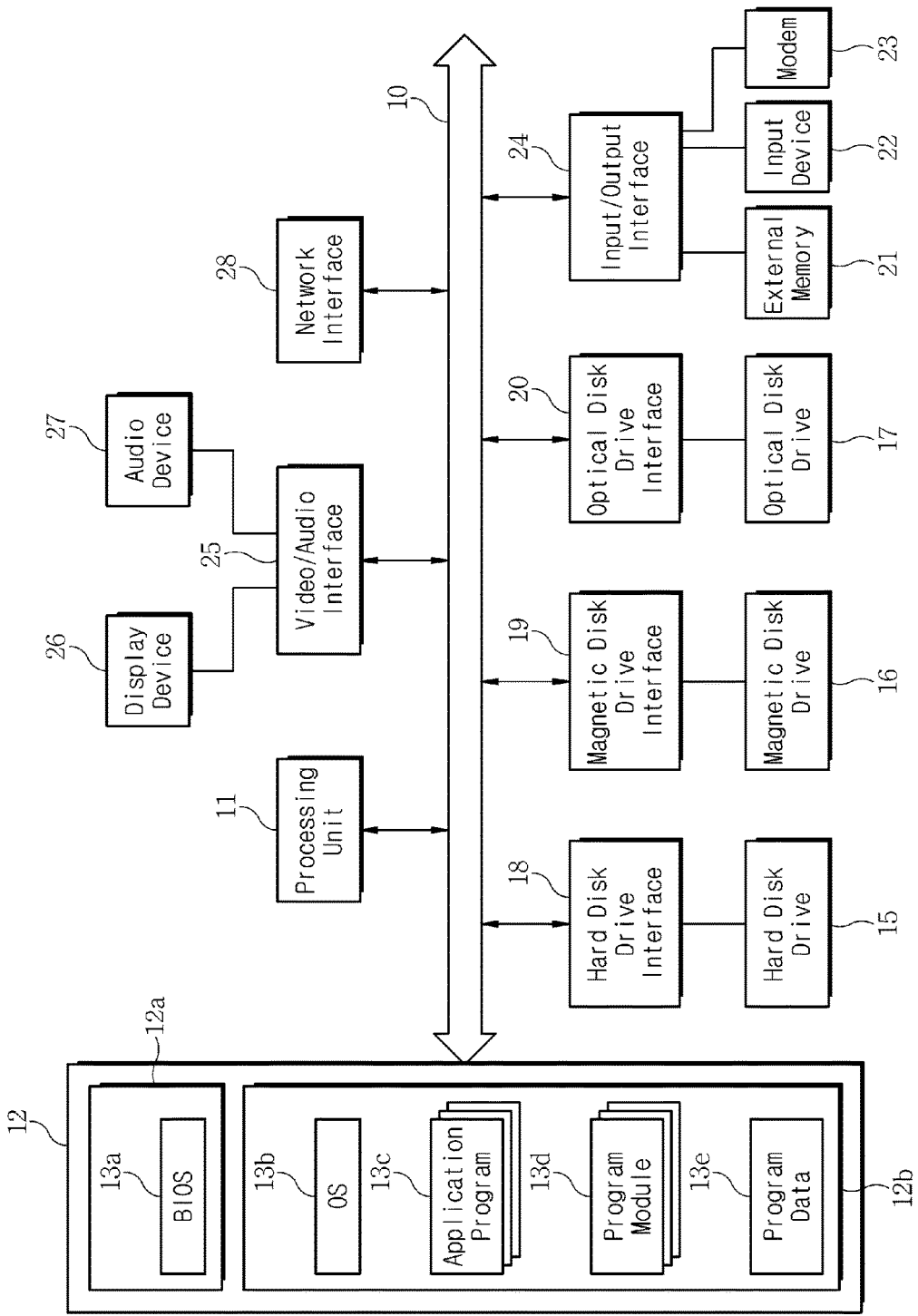
FIG. 12 is a block diagram showing an operating environment in a beacon service system for verifying the validity of a beacon signal according to an embodiment of the present invention.

FIG. 12 is a block diagram showing an operating environment of an apparatus for providing a beacon signal validity verification method in a beacon service system according to an embodiment of the present invention.

FIG. 12 and the following discussion are intended to provide a brief, general description of a suitable computing environment in which the present invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

Referring to FIG. 12, an example computing system for implementing the invention includes a general-purpose computing device in the form of a computer system including a processing unit 11, a system memory 12, and a system bus 10 that couples various system components including the system memory 12 to the processing unit 11.

The processing unit 11 may execute computer-executable instructions designed to implement features of the present invention.

The system bus 10 may be any of several types of bus structures including a memory bus or memory controller, a peripheral bus, and a local bus using any of a variety of bus architectures. The system memory 12 includes a read only memory (ROM) 12a and a random access memory (RAM) 12b. A basic input/output system (BIOS) 13a, containing the basic routines that help transfer information between elements within computing system, such as during start-up, may be stored in the ROM 12a.

The computing system may include a storage device. For example, the storage device may include, for example, a hard disk drive 15 for reading information from or writing information to a hard disk, a magnetic disk drive 16 for reading information from and writing information to a magnetic disk, and an optical disk drive 17 for reading information from or writing information to an optical disk, such as, for example, a CD-ROM or other optical media. The hard disk drive 15, magnetic disk drive 16, and optical disk drive 17 are connected to the system bus 10 by a hard disk drive interface 18, a magnetic disk drive interface 19, and an optical drive interface 20, respectively.

In addition, the computing system may further include an external memory 21 as the storage device. The external memory 21 may be connected to the system bus 10 through an input/output interface 24.

The drives and their associated computer-readable media provide nonvolatile storage of computer-executable instructions, data structures, program modules, and other data for the computer system. Although the example environment described herein employs the hard disk drive 15, the magnetic disk drive 16 and the optical disk drive 17, other types of computer-readable media for storing data may be used, including magnetic cassettes, flash memory cards, digital versatile disks, Bernoulli cartridges, RAMs, ROMs, and the like.

Program code means including one or more program modules may be stored in the hard disk drive 15, magnetic disk drive 16, optical disk drive 17, ROM 12a, or RAM 12b, including an operating system 13b, one or more application programs 13c, other program modules 13d, and program data 13e, which are loaded and executed by the processing unit 11.

Moreover, a user may enter commands and information into the computing system through a keyboard, a pointing device, or other input devices 22, such as, for example, a microphone, joy stick, game pad, scanner, or the like. These input devices 22 can be connected to the processing unit 11 through the input/output interface 24 coupled to the system bus 10. The input/output interface 24 logically represents any of a wide variety of possible interfaces, such as, for example, a serial port interface, a PS/2 interface, a parallel port interface, a Universal Serial Bus (USB) interface, or an Institute of Electrical and Electronics Engineers (IEEE) 1394 interface (i.e., a FireWire interface), or may even logically represent a combination of different interfaces.

In addition, the computing system according to the present invention may further include a display device 26 such as a monitor or liquid crystal display (LCD) and an audio device 27 such as a speaker or microphone. The display device 26 and the audio device 27 are connected to the system bus 10 through a video/audio interface 25. For example, other peripheral devices (not shown), such as, for example, speakers and printers, can also be connected to the computer system. The video/audio interface 25 may include a High Definition Multimedia Interface (HDMI), a Graphics Device Interface (GDI), etc.

In addition, the computing system is connectable to networks, such as, for example, an office-wide or enterprise-wide computer network, a home network, an intranet, and/or the Internet. The computer system can exchange data with external sources, such as, for example, remote computer systems, remote applications, and/or remote databases over such networks.

The computing system according to an embodiment of the present invention includes a network interface 28, through which the computing system receives data from external sources and/or transmits data to external sources.

In the present invention, the computing system may transmit information to or receive information from a device located in a remote position through the network interface 28. For example, when the computing system denotes the user terminal 100, the computing system may transmit information to or receive information from the content beacon device 600 or the verification beacon device 500 through the network interface 28. When the computing system denotes the content beacon device 600 or the verification beacon device 500, the computing system may transmit information to or receive information from the user terminal 100 through the network interface 28. The network interface 28 can logically represent one or more software and/or hardware modules, such as, for example, a network interface card and corresponding Network Driver Interface Specification (NDIS) stack.

Likewise, the computer system receives data from external sources and/or transmits data to external sources through the input/output interface 24. The input/output interface 24 may be coupled to a modem 23 (e.g., a standard modem, a cable modem, or a digital subscriber line (DSL) modem), through which the computer system receives data from and/or transmits data to external sources.

While FIG. 12 represents a suitable operating environment for the present invention, the principles of the present invention may be employed in any system that is capable of, with suitable modification if necessary, implementing the principles of the present invention. The environment illustrated in FIG. 12 is illustrative only and by no means represents even a small portion of the wide variety of environments in which the principles of the present invention may be implemented.

Moreover, a variety of information that is generated when the beacon service system verifies the validity of the beacon signal according to an embodiment of the present invention may be stored and accessed from any of the computer-readable media associated with the computing system. For example, portions of such program modules and portions of associated program data may be included in the operating system 13b, application programs 13c, program modules 13d and/or program data 13e, for storage in the system memory 12.

When a mass storage device, such as, for example, a hard disk, is coupled to the computing system, such program modules and associated program data may also be stored in the mass storage device. In a networked environment, program modules associated with the present invention, or portions thereof, can be stored in remote computer system coupled through the modem 23 of the input/output interface 24 or the network interface 25. As described above, execution of such modules may be performed in a distributed environment.

The specification includes details of a number of specific implementations, but it should be understood that the details do not limit the invention or what is claimable in the specification but rather describe features of the specific embodiments. Features described in the specification in the context of individual embodiments may be implemented as a combination in a single embodiment. In contrast, features described in the specification in the context of a single embodiment may be implemented in multiple embodiments individually or in an appropriate sub-combination. Furthermore, the features may operate in a certain combination and may be initially described as claimed in the combination, but one or more features may be excluded from the claimed combination in some cases, and the claimed combination may be changed into a sub-combination or a modification of a sub-combination.

Similarly, even though operations are described in a certain order in the drawings, it should not be understood that the operations be executed in the certain order or in a sequential order to obtain desired results, or that all the operations be executed. In some cases, multitasking and parallel processing may be beneficial. In addition, it should not be understood that the separation of various system components in the above described embodiments is required in all embodiments, and it should be understood that the above described program components and systems may be incorporated into a single software product or may be packaged in multiple software products.

Thus, particular embodiments have been described. Other embodiments are within the scope of the following claims. For example, the operations recited in the claims can be performed in a different order and still achieve desirable results. As an example, operations depicted in the drawings in a particular order should not be understood as requiring that such operations be performed in the particular order shown or in sequential order. In certain implementations, multitasking and parallel processing may be advantageous.

The description suggests the best mode of the present invention to provide an example that explains the present invention and also enables one skilled in the art to manufacture and use the present invention. The specification drafted as such is not limited to detailed terms suggested in the specification. Accordingly, it will be apparent to those skilled in the art that various modifications, changes, and variations may be made in the example without departing from the scope of the invention.

Accordingly, the scope of the present invention should be defined not by the embodiments but by the appended claims.

INDUSTRIAL APPLICABILITY

The present invention relates to a method, system, and apparatus for verifying the validity of a beacon signal, and more particularly, to a method, system, and apparatus for determining whether authentication information received from a beacon service server and authentication information received from a verification beacon server are the same to verify whether a beacon signal received by a user terminal is valid.

According to an embodiment of the present invention, a user who has visited a member shop can receive information about only the visited member shop, instead of showing information associated with a malicious beacon signal or a beacon signal provided from another member shop except the member shop where the user has visited. Thus, the member shop can increase operating profit because an opportunity to sell products is not missed, and the user can focus on product purchasing activity in the member shop to reduce a product purchase time and increase shopping efficiency because the user is exposed to information about only the visited member shop. As a result, the present invention can promote consumption and contribute to the development of industry.

Moreover, the present invention has industrial applicability in that the possibility of sales or business is sufficient and also actually the present invention ma be carried out.

In this specification, exemplary embodiments of the present invention have been classified into the first, second and third exemplary embodiments and described for conciseness. However, respective steps or functions of an exemplary embodiment may be combined with those of another exemplary embodiment to implement still another exemplary embodiment of the present invention.

What is claimed is:

1. A beacon service server, the beacon service server comprising:
  a network interface configured to communicate with a user terminal and a verification beacon device corresponding to a content beacon device;
  a processor configured to:
    receive, from the user terminal, a validity verification request for a beacon signal of the content beacon device,
    generate first authentication information for validity verification,
    transmit the first authentication information to the user terminal, and
    further transmit the first authentication information to the verification beacon device, wherein the verification beacon device is separate from the user terminal and is configured to:

transmit, as second authentication information, the received first authentication information to the user terminal, wherein the user terminal is configured to:
> compare the first authentication information and the second authentication information; and
> determine validity of the beacon signal based, at least in part, on whether the first authentication information and the second authentication information includes same information; and a memory configured to store mapping information between content beacon devices and member shops.

2. The beacon service server of claim 1, wherein, when a validity verification request for a plurality of content beacon devices is received from the user terminal, the processor is configured to:
select one content beacon device based on distances between the user terminal and the content beacon devices,
transmit authentication information for verifying validity of a selected content beacon device; and
simultaneously perform control such that the authentication information is transmitted to the user terminal through the verification beacon device corresponding to the selected content beacon device.

3. The beacon service server of claim 1, wherein the content beacon device and the verification beacon device are implemented as one beacon device, and wherein the one beacon device is configured to transmit both a first beacon signal of the content beacon device and a second beacon signal of the verification beacon device while setting the first and second beacon signals to have different data types and intervals.

4. The beacon service server of claim 1, wherein the processor is further configured to check, based on beacon identification information of the beacon signal, whether there is a member shop matched to the content beacon device, and wherein the verification beacon device corresponds to the member shop matched to the content beacon device.

5. A method of verifying validity of a beacon signal by a beacon service server, the method comprising:
receiving, from a user terminal, a validity verification request for a beacon signal of a content beacon device;
generating first authentication information for validity verification;
transmitting the first authentication information to the user terminal; and
transmitting the first authentication information to a verification beacon device corresponding to the content beacon device, wherein the verification beacon device is separate from the user terminal, and wherein the verification beacon device is configured to:
> transmit, as second authentication information, the received first authentication information to the user terminal, wherein the user terminal is configured to:
> compare the first authentication information and the second authentication information; and
> determine validity of the beacon signal based, at least in part, on whether the first authentication information and the second authentication information includes same information.

6. The method of claim 5, further comprising
checking whether there is a member shop corresponding to the content beacon device,
wherein the authentication information is transmitted when there is the member shop and the authentication information is not transmitted when there is not the member shop.

7. The method of claim 5, wherein transmitting of the authentication information to the user terminal through a verification beacon device comprises
transmitting, to the user terminal, user information matched to the user terminal through the verification beacon device together with the authentication information.

8. The method of claim 5, wherein the generating comprises generating one-time authentication information.

9. The method of claim 5, wherein the content beacon device and the verification beacon device are implemented as one beacon device, and wherein the one beacon device is configured to transmit both a first beacon signal of the content beacon device and a second beacon signal of the verification beacon device while setting the first and second beacon signals to have different data types and intervals.

10. The method of claim 5, wherein the method further comprises checking, based on beacon identification information of the beacon signal, whether there is a member shop matched to the content beacon device, and wherein the verification beacon device corresponds to the member shop matched to the content beacon device.

11. A method of verifying validity of a beacon signal by a user terminal, the method comprising:
receiving a beacon signal from a content beacon device;
requesting a beacon service server to verify validity of the received beacon signal;
receiving first authentication information from the beacon service server;
receiving second authentication information from a verification beacon device, wherein the second authentication information is transmitted by the verification beacon device based on receipt of the first authentication information, and wherein the verification beacon device is separate from the user terminal; and
comparing the first authentication information received from the beacon service server with the second authentication information received from the verification beacon device; and
determining validity of the beacon signal according to whether the first authentication information from the beacon service server and the second authentication information from the verification beacon device include same information.

12. The method of claim 11, wherein the determining of the validity of the beacon signal comprises comparing user information received from the verification beacon device with pre-stored user information and, when the received user information and the prestored user information are the same, comparing the authentication information received from the beacon service server and the authentication information received from the verification beacon device to determine the validity of the beacon signal.

13. The method of claim 11, further comprising:
when the authentication information is not received from the verification beacon device within a certain time, determining that the beacon signal received from the content beacon device is not valid.

14. The method of claim 11, wherein the content beacon device and the verification beacon device are implemented as one beacon device, and wherein the one beacon device is configured to transmit both a first beacon signal of the content beacon device and a second beacon signal of the verification beacon device while setting the first and second beacon signals to have different data types and intervals.

* * * * *